US012565070B2

(12) United States Patent
Otsu

(10) Patent No.: US 12,565,070 B2
(45) Date of Patent: Mar. 3, 2026

(54) VIBRATION PROOFING DEVICE

(71) Applicant: Prospira Corporation, Kawasaki (JP)

(72) Inventor: Kazutaka Otsu, Kawasaki (JP)

(73) Assignee: Prospira Corporation, Kawasaki city (JP)

( * ) Notice: Subject to any disclaimer, the term of this patent is extended or adjusted under 35 U.S.C. 154(b) by 0 days.

(21) Appl. No.: 19/106,213

(22) PCT Filed: Jul. 6, 2023

(86) PCT No.: PCT/JP2023/025187
§ 371 (c)(1),
(2) Date: Feb. 25, 2025

(87) PCT Pub. No.: WO2024/053233
PCT Pub. Date: Mar. 14, 2024

(65) Prior Publication Data
US 2026/0048634 A1      Feb. 19, 2026

(30) Foreign Application Priority Data
Sep. 7, 2022      (JP) ................................. 2022-142549

(51) Int. Cl.
B60G 15/06          (2006.01)

(52) U.S. Cl.
CPC ...... B60G 15/065 (2013.01); B60G 2202/312 (2013.01); B60G 2204/128 (2013.01); B60G 2204/41 (2013.01); B60G 2204/44 (2013.01)

(58) Field of Classification Search
CPC ............ B60G 15/065; B60G 2202/312; B60G 2204/128; B60G 2204/41; B60G 2204/44
(Continued)

(56) References Cited

U.S. PATENT DOCUMENTS 4,971,296 A * 11/1990 Kondo ..................... B60G 3/26
                                                      267/220
5,263,694 A * 11/1993 Smith ....................... F16F 1/32
                                                      267/33
(Continued)

FOREIGN PATENT DOCUMENTS

EP          0619196 A1    10/1994
JP          S4636330 B    10/1971
(Continued)

OTHER PUBLICATIONS

Aug. 15, 2023, International Search Report issued in the International Patent Application No. PCT/JP2023/025187.
(Continued)

*Primary Examiner* — Toan C To
(74) *Attorney, Agent, or Firm* — KENJA IP LAW PC

(57) ABSTRACT

Provided is an anti-vibration device 1 configured for use in a suspension, comprising an extension and retraction section 12 having a damper rod 121 and a cylinder 122; a strut mount section 13 attached to the damper rod; a suspension spring section 17 arranged on an outer circumferential side of the extension and retraction section; a support section 16 made of a rigid body configured to support an upper end portion of the suspension spring section; a laminated section 14 arranged on an outer circumferential side of the damper rod and connected between the strut mount section and the support section, wherein the laminated section has an annular rubber layer 141 and an annular rigid layer 142 that are alternately laminated in an axial direction.

8 Claims, 11 Drawing Sheets

(58) Field of Classification Search
USPC ..... 280/124.145, 124.146, 124.147, 124.154
See application file for complete search history.

(56)                     References Cited

U.S. PATENT DOCUMENTS

| | | | | |
|---|---|---|---|---|
| 5,342,029 A * | 8/1994 | Carter | ................. | B60G 15/067 |
| | | | | 267/33 |
| 5,487,535 A * | 1/1996 | Carter | ...................... | F16F 9/58 |
| | | | | 267/293 |
| 6,126,155 A * | 10/2000 | Smith | ................. | B60G 15/067 |
| | | | | 267/293 |
| 6,247,688 B1 * | 6/2001 | De Fontenay | ....... | B60G 15/068 |
| | | | | 280/124.145 |
| 6,375,205 B1 | 4/2002 | De Fontenay et al. | | |
| 8,556,047 B2 * | 10/2013 | Kondou | ................. | F16F 9/065 |
| | | | | 267/221 |
| 8,888,081 B2 * | 11/2014 | Inoue | ................... | B60G 15/067 |
| | | | | 188/321.11 |
| 11,440,365 B2 * | 9/2022 | Hosoda | ................ | B60G 13/003 |
| 2017/0368899 A1 * | 12/2017 | Hamada | .................... | F16F 9/54 |
| 2023/0286343 A1 * | 9/2023 | Ueki | ................... | B60G 15/068 |

FOREIGN PATENT DOCUMENTS

| | | | |
|---|---|---|---|
| JP | H08285002 A | 11/1996 |
| JP | 2001517584 A | 10/2001 |
| JP | 2002206583 A | 7/2002 |

OTHER PUBLICATIONS

Mar. 1, 2025, International Preliminary Report on Patentability issued in the International Patent Application No. PCT/JP2023/025187.

* cited by examiner

A-A cross section

VIBRATION PROOFING DEVICE

TECHNICAL FIELD

This disclosure relates to an anti-vibration device.

This application claims priority based on Japanese Patent Application No. 2022-142549, which was filed in Japan on Sep. 7, 2022, and the entire contents of which are hereby incorporated by reference.

BACKGROUND

Conventionally, there is an anti-vibration device with a bearing between a strut mount and a support member that supports a coil spring (e.g., Patent Document 1).

CITATION LIST

Patent Literature

PTL 1: JP H08-285002 A

SUMMARY

Technical Problem

However, with conventional technology, there was room for improvement in terms of cost.

An object of the present disclosure is to provide an anti-vibration device that enables cost reduction.

Solution to Problem

An anti-vibration device configured for use in a suspension, comprising
an extension and retraction section having a damper rod and a cylinder;
a strut mount section attached to the damper rod;
a suspension spring section arranged on an outer circumferential side of the extension and retraction section;
a support section made of a rigid body and configured to support an upper end portion of the suspension spring section; and
a laminated section arranged on an outer circumferential side of the damper rod and connected between the strut mount section and the support section, wherein
the laminated section has an annular rubber layer and an annular rigid layer that are alternately laminated in an axial direction.

Advantageous Effect

According to the present disclosure, it is possible to provide an anti-vibration device that enables cost reduction.

DETAILED DESCRIPTION

The anti-vibration device according to this disclosure is suitable for use with strut suspensions, and is particularly suitable for use with MacPherson strut suspensions. In addition, the anti-vibration device according to this disclosure can be applied to any type of vehicle, but it is particularly suitable for relatively inexpensive and lightweight vehicles such as micromobility vehicles.

Hereinafter, embodiments of the anti-vibration device according to the present disclosure will be described with reference to the drawings.

First Embodiment

Figure 1:
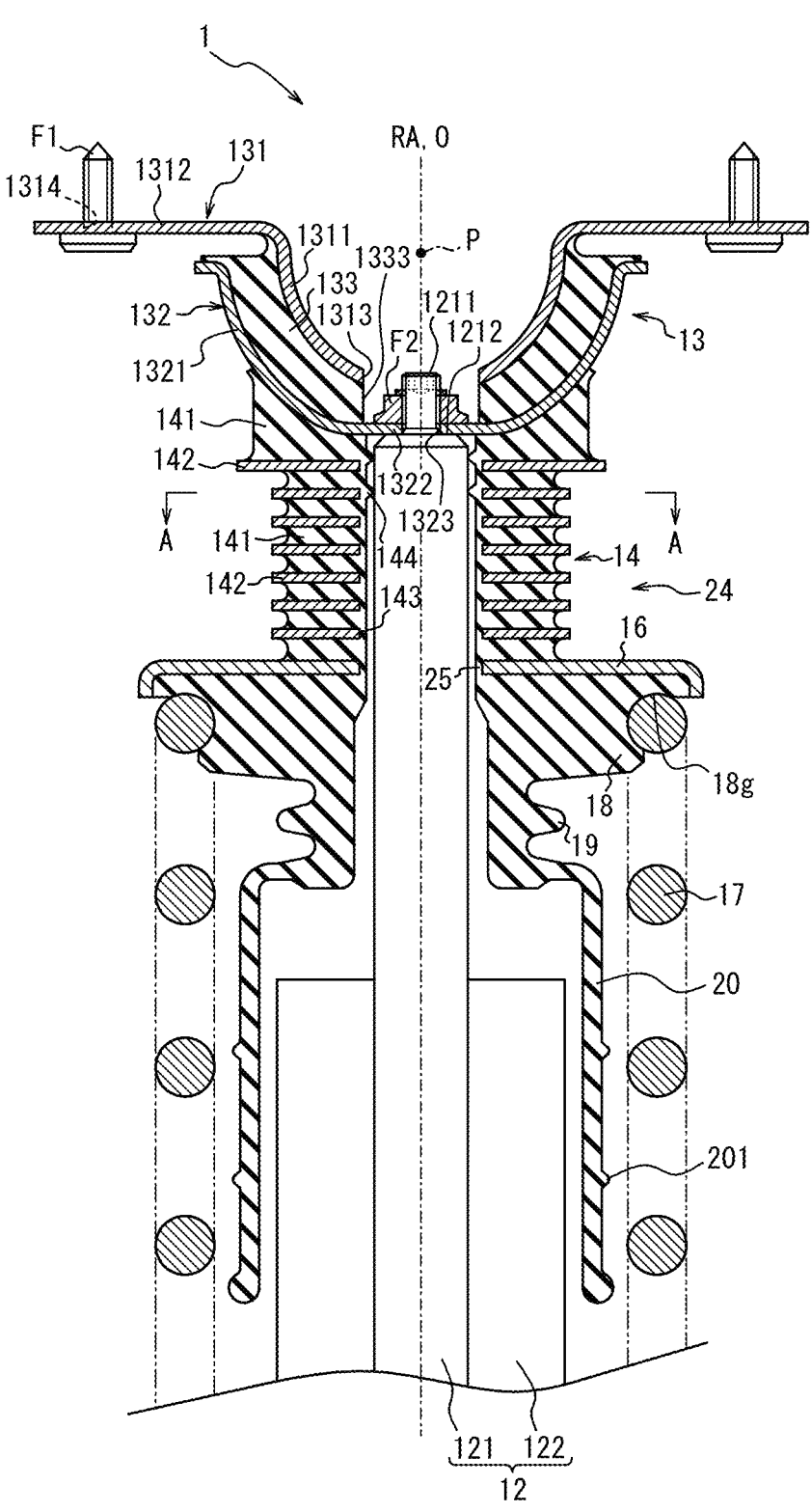
FIG. 1 is a longitudinal cross-sectional view illustrating an anti-vibration device according to a first embodiment of the present disclosure.
Figure 2:
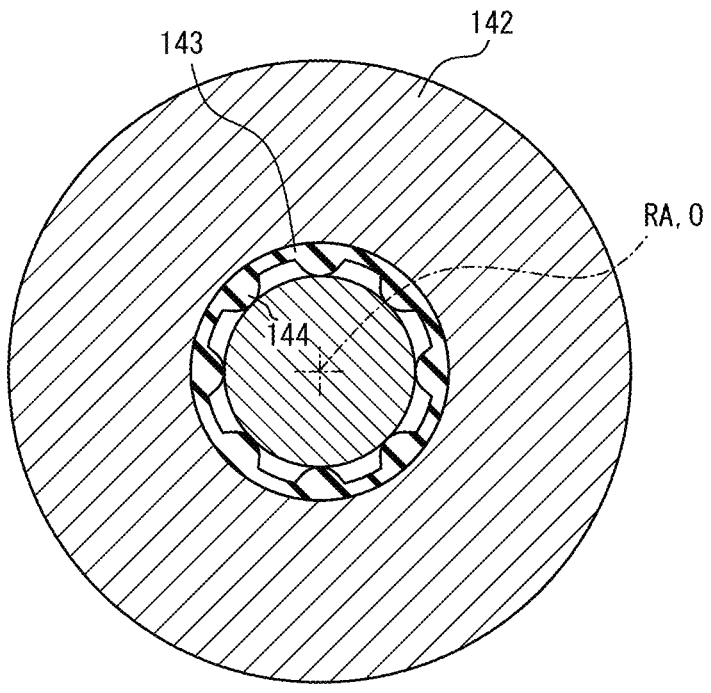
FIG. 2 is an A-A cross-sectional view of the anti-vibration device in FIG. 1, illustrated in a cross-section along the line A-A in FIG. 1.

FIGS. 1 and 2 are drawings to explain an anti-vibration device 1 according to a first embodiment of the present disclosure.

The anti-vibration device 1 of this embodiment is configured to be used in a suspension of a vehicle. As for the suspension in which the anti-vibration device 1 is used, a strut suspension is suitable, and a MacPherson strut suspension is even more suitable. In addition, the anti-vibration device 1 according to this embodiment can be applied to any type of vehicle, but it is particularly suitable for relatively inexpensive and lightweight vehicles such as micromobility vehicles.

As illustrated in FIG. 1, in the first embodiment, the anti-vibration device 1 comprises an extension and retraction section 12, a strut mount section 13, a suspension spring section 17, a support section 16, a laminated section 14, a receiving rubber section 18, a bump rubber section 19, and a dust cover section 20.

The suspension (not illustrated in the figure) that comprises the anti-vibration device 1 also comprises a hub (not illustrated in the figure), a knuckle (not illustrated in the figure), etc. in addition to the anti-vibration device 1.

The extension and retraction section 12 has a damper rod 121 and a cylinder 122. The cylinder 122 is arranged coaxially with the center axis of the damper rod 121 (hereinafter, referred to as "rod axis RA") and is located on the outer circumference side of the damper rod 121. The damper rod 121 and the cylinder 122 are capable of sliding relative to each other, and as a result, the extension and retraction section 12 is configured to be capable of extending and retracting in a direction parallel to the rod axis RA (axial direction). The top end of the cylinder 122 is located below the top end of the damper rod 121. In this embodiment, the extension and retraction section 12 is configured as a shock absorber. The extension and retraction section 12 may have a structure similar to that of conventionally known shock absorbers.

In the suspension (not illustrated in the figure), the knuckle (not illustrated in the figure) protrudes inward from the hub (not illustrated in the figure) in the left-right direction of the vehicle. The hub (not illustrated in the figure) supports the wheels (not illustrated in the figure; e.g. front wheels) so that they can rotate.

The lower end portion of the cylinder 122 of the extension and retraction section 12 (not illustrated in the figure) is configured to be connected to the knuckle (not illustrated in the figure).

In this document, the inner side (inward) in the left-right direction of the vehicle refers to the side closer to the center of the vehicle in the left-right direction of the vehicle. On the other hand, the outer side (outward) in the left-right direction of the vehicle refers to the side farther from the center of the vehicle in the left-right direction of the vehicle.

In a state where the vehicle is stationary, the rod axis RA is approximately parallel to the up-down direction of the vehicle. The rod axis RA may be inclined at an acute angle to the up-down direction of the vehicle, for example, and it may extend in such a way that it moves towards the inner side in the left-right direction of the vehicle as it moves upwards.

As illustrated in FIG. 1, the anti-vibration device 1 extends along the anti-vibration device axis O.

In a state where the vehicle is stationary, the rod axis RA is aligned with the anti-vibration device axis O. On the other hand, while the suspension of the vehicle is moving, the damper rod 121 can oscillate (make tortional displace) around the predetermined oscillate center point P while changing the angle of the rod axis RA relative to the anti-vibration device axis O.

Unless otherwise specified, this document describes the configuration of the anti-vibration device 1 when the vehicle is stationary.

In addition, in this document, unless otherwise specified, the direction parallel to the anti-vibration device axis O or the rod axis RA is referred to as the "axial direction", the side closer to the anti-vibration device axis O or the rod axis RA is referred to as the "inner circumferential side", the side further away from the anti-vibration device axis O or the rod axis RA is referred to as the "outer circumferential side", the circumferential direction around the anti-vibration device axis O or the rod axis RA is referred to as the "circumferential direction", the radial direction around the anti-vibration device axis O or the rod axis RA is referred to as the "radial direction", and the direction perpendicular to the axial direction is referred to as the "axis right-angle direction".

The strut mount section 13 is attached to the upper end portion of the damper rod 121. In this embodiment, the strut mount section 13 has a bracket 131, a mounting member 132, and a mount main body rubber 133.

The bracket 131 is made of a rigid body such as metal and is designed to be attached to the vehicle body.

The bracket 131 is configured in an annular shape and has a central through hole 1313 that penetrates the bracket 131 in the axial direction. The center axis of the central through hole 1313 is aligned with the anti-vibration device axis O.

In this embodiment, the bracket 131 has a curved part 1311 and a flange part 1312.

The central through hole 1313 is formed in the center of the curved part 1311.

The curved part 1311 is convexly curved downward. The curved part 1311 is curved along the spherical shape. The center point P of the curved surface along which the curved part 1311 is located is on the anti-vibration device axis O.

The flange part 1312 extends from the end portion on the upper side and outer circumferential side of the curved part 1311 to the outer circumferential side. The flange part 1312 has a plurality of fastening holes 1314. The flange part 1312 is configured to be attached to the vehicle body by passing a plurality of fasteners F1 through these fastening holes 1314 and tightening them against the vehicle body. The fasteners F1 are, for example, bolts.

However, the bracket 131 may be configured to be attached to the vehicle body by a means other than fastening with the fastener F1.

The mounting member 132 is made of a rigid material such as metal, and is attached to the upper end portion of the damper rod 121.

In this embodiment, the mounting member 132 is configured in an annular shape and has a central through hole 1323 that passes through the mounting member 132 in the axial direction. The center axis of the central through hole 1323 is aligned with the anti-vibration device axis O. On the other hand, the damper rod 121 has a mounting part 1211 at the upper end portion thereof. The mounting part 1211 has a smaller diameter than the part of the damper rod 121 that is below the mounting part 1211. The outer circumference of the mounting part 1211 has a male screw thread. The damper rod 121 has a stepped surface 1212 that extends from the lower end of the mounting part 1211 to the outer circumferential side and faces upwards. The mounting member 132 is configured to be attached to the damper rod 121 by having the mounting part 1211 of the damper rod 121 passed through the central through hole 1323 of the mounting member 132, and being tightened from the top side using a fastener such as a nut F2 while the lower surface of the mounting member 132 is in contact with the stepped surface 1212 of the damper rod 121.

However, the mounting member 132 may be attached to the damper rod 121 using a different structure to that illustrated in this example.

In this embodiment, the mounting member 132 has a curved part 1321 and a mounting part 1322.

The central through hole 1323 is formed in the center of the mounting part 1322. The mounting part 1322 extends parallel to the axis right-angle direction.

The curved part 1321 extends from the end portion on the outer circumferential side of the mounting part 1322 toward the outer circumferential side. The curved part 1321 is convexly curved downward. The curved part 1321 is curved along the spherical shape. The center point P of the curved surface along which the curved part 1321 is located is on the anti-vibration device axis O.

In this embodiment, the mounting member 132 is located at a position, below the bracket and separated from the same.

The mount main body rubber 133 is made of rubber. The mount main body rubber 133 is located between the bracket 131 and the mounting member 132, and connects the bracket 131 and the mounting member 132.

The mount main body rubber 133 and the bracket 131, as well as the mount main body rubber 133 and the mounting member 132, are fixed together using vulcanization or other methods.

In this embodiment, each of the curved parts 1311 and 1321 of the bracket 131 and the mounting member 132 is curved along a spherical shape with the same center point P. This makes the center point P of these spherical shapes the elastic center of the mount main body rubber 133.

As a result, the bracket 131 and the mounting member 132, which are curved in the same way, are connected via the relatively soft mount main body rubber 133, so the mounting member 132 and the damper rod 121 attached to it can easily oscillate (make tortional displace) in any direction with respect to the bracket 131, with the above center point P as the oscillate center point. Therefore, the strut mount section 13 can effectively absorb the torsional displacement when the damper rod 121 oscillates (makes torsional displacement) during suspension stroke, for example, and this enables reduction of interior noise and improvement of ride comfort.

The configuration of the strut mount section 13 is not limited to the above and may be any configuration, and it can be the same configuration as the conventionally known strut mount, for example.

The suspension spring section 17 is arranged on the outer circumferential side of the extension and retraction section 12.

In this embodiment, the suspension spring section 17 is configured as a coil spring made of metal. The upper end portion of the suspension spring section 17 is supported from above by the support section 16. The lower end portion of the suspension spring section 17 is supported by a receiving part (not illustrated in the figure) fixed to the cylinder 122 of the extension and retraction section 12. The suspension spring section 17 is biased in the direction of extension.

The support section 16 is made of a rigid material such as metal, and is configured to support the upper end portion of the suspension spring section 17 via the receiving rubber section 18.

In this embodiment, the support section 16 is annular in shape, is arranged on the outer circumferential side of the damper rod 121, and extends along the axis right-angle direction. However, the shape of the support section 16 may be arbitrary.

In this embodiment, the support section 16 is located at a position, below the strut mount section 13 and separated from the same.

The receiving rubber section 18 is made of rubber and is configured to receive the upper end portion of the suspension spring section 17. The receiving rubber section 18 is located between the support section 16 and the upper end portion of the suspension spring section 17. In this embodiment, the receiving rubber section 18 has a receiving groove 18g with an open outer circumference, and the upper end portion of the suspension spring section 17 is fitted into the receiving groove 18g by press fitting or other means, thereby receiving the upper end portion of the suspension spring section 17. This securely fixes the upper end portion of the suspension spring section 17 to the receiving rubber section 18, so it can effectively prevent the suspension spring section 17 from slipping due to the reaction force of the rubber part of the laminated section 14. However, the shape of the receiving rubber section 18 can be arbitrary.

The presence of the receiving rubber section 18 allows the vibration transmitted from the suspension spring section 17 to be absorbed, and suppresses the transmission of this vibration to the vehicle body.

In this embodiment, the receiving rubber section 18 and the support section 16 are fixed together by vulcanization or other means.

The laminated section 14 is configured as a cylinder in shape and is arranged on the outer circumferential side of the damper rod 121. The laminated section 14 is located between the strut mount section 13 and the support section 16, and is connected between the strut mount section 13 and the support section 16. More specifically, in this embodiment, the laminated section 14 connects the strut mount section 13 and the support section 16. However, further components may be connected between the strut mount section 13 and the laminated section 14 and/or between the support section 16 and the laminated section 14.

The laminated section 14 has an annular rubber layer 141 and an annular rigid layer 142 that are alternately laminated in the axial direction. The laminated section 14 has one or more layers of the annular rubber layer 141 and one or more layers of the annular rigid layer 142. The annular rubber layer 141 and the annular rigid layer 142 are each configured in an annular shape that extends along the circumferential direction over the entire circumference. The annular rubber layer 141 is made of rubber. The annular rigid layer 142 is made of a rigid material such as metal.

The upper end portion of the laminated section 14 is configured with the annular rubber layer 141, and is connected to the strut mount section 13 (specifically, the mounting member 132).

The lower end portion of the laminated section 14 is configured with the annular rubber layer 141, and is connected to the support section 16.

In this embodiment, the annular rubber layer 141 and the annular rigid layer 142; the annular rubber layer 141 and the strut mount section 13 (specifically, the mounting member 132); and the annular rubber layer 141 and the support section 16 are fixed together by vulcanization or other means.

As explained above, the laminated section 14 has the annular rubber layer 141, so it is configured to have low rigidity in the circumferential direction. As a result, the strut mount section 13 is supported so that it can easily rotate around the rod axis RA relative to the support section 16 via the laminated section 14. Therefore, for example, the rotation of the suspension spring section 17 around the rod axis RA when the vehicle is turning can be effectively absorbed by the laminated section 14.

On the contrary, the laminated section 14 has the annular rigid layer 142, so it is highly rigid in the up-down direction. Therefore, it is possible to firmly support the load from the vehicle body.

It will be noted that the laminated section 14 has the same function as the bearing that is provided between a strut mount and a support member that supports a coil spring in conventional general-purpose anti-vibration devices, and this makes it possible to eliminate the need for the bearing. The laminated section 14 can be obtained at a lower cost than the bearing, and it is also possible to reduce the number of man-hours required for assembly of the anti-vibration device. Therefore, by comprising the laminated section 14 instead of the bearing, it is possible for the anti-vibration device 1 to reduce costs and the number of assembly man-hours, while still having the same functions as a bearing. In addition, in general, if dust enters the bearing, it can cause poor sliding, leading to worsening of steering feel and the generation of strange noises, however, the laminated section 14 does not have such problems.

In general, there is a high demand for simple and inexpensive structures in relatively inexpensive and lightweight vehicles such as micromobility vehicles. The laminated section 14 makes it possible to meet such requests.

As illustrated in FIG. 1, in this embodiment, the laminated section 14 has a rubber membrane 143 that covers the inner circumferential surface of each annular rubber layer 141 and each annular rigid layer 142, and the rubber membrane 143 constitutes the inner circumferential surface of the laminated section 14. The rubber membrane 143 connects the annular rubber layers 141 each other.

Although the illustration is omitted, the laminated section 14 may have a rubber membrane 143 that covers the outer circumferential surface of each annular rubber layer 141 and each annular rigid layer 142, and also constitutes the outer circumferential surface of the laminated section 14, in addition to or instead of the rubber membrane 143 on the inner circumferential side. In addition, the laminated section 14 may not have a rubber membrane 143 on either the inner or outer circumferential side.

As illustrated in FIG. 1, in this embodiment, the inner circumferential surface of the laminated section 14 is separated from the outer circumferential surface of the damper rod 121 to the outer circumferential side. This reduces the contact area between the laminated section 14 and the damper rod 121, allowing the laminated section 14 to rotationally displace in a circumferential direction easily with respect to the damper rod 121.

As illustrated in FIG. 1, in this embodiment, the laminated section 14 has a plurality of protrusions 144 that protrude from the inner circumferential surface thereof toward the inner circumferential side. The plurality of projections 144 are arranged with a gap between them in the circumferential direction at one or more positions (two in the example in FIG. 1) in the axial direction (FIG. 2). The tips of the plurality of protrusions 144 are in contact with the outer circumferential surface of the damper rod 121. The plurality of protrusions 144 can maintain the laminated section 14 in coaxial alignment with the damper rod 121 more securely, while also preventing an increase in the contact area between the laminated section 14 and the damper rod 121.

In this embodiment, these protrusions 144 are made of rubber.

Although the illustration is omitted, the inner circumferential surface of the laminated section 14 may be in contact with the outer circumferential surface of the damper rod 121 over its entire circumference. In this case, the protrusion 144 is not necessary. In this case, it is suitable to interpose grease or oil, etc. between the inner circumferential surface of the laminated section 14 and the outer circumferential surface of the damper rod 121, thereby reducing the friction between the laminated section 14 and the damper rod 121 and enabling the laminated section 14 to rotationally displace in a circumferential direction with respect to the damper rod 121.

The bump rubber section 19 is made of rubber. The bump rubber section 19 is configured as a cylinder in shape and is arranged on the outer circumferential side of the damper rod 121. The bump rubber section 19 is arranged below the support section 16. The receiving rubber section 18 is located on the outer circumferential side of the bump rubber section 19.

The under surface of the bump rubber section 19 is configured so that it can come into contact with the upper end portion of the cylinder 122 during the extension and retraction of the contact section 12.

The bump rubber section 19 is configured to restrict the further relative movement of the cylinder 122 upwards (and thereby stop the retraction stroke of the extension and retraction section 12) by letting the cylinder 122 to move a certain distance upward relative to the damper rod 121 and causing the upper end portion of the cylinder 122 comes into contact with the lower surface of the bump rubber section 19. The bump rubber section 19 is made of rubber, so it can cushion the impact when the cylinder 122 collides with the bump rubber section 19.

In this embodiment, the outer circumferential surface of the bump rubber section 19 has a wave shape that oscillates in the axis right-angle direction in a cross-section along the axial direction, as illustrated in FIG. 1. However, the shape of the bump rubber section 19 can be arbitrary.

In this embodiment, the inner circumferential surface of the bump rubber section 19 is separated from the outer circumferential surface of the damper rod 121 to the outer circumferential side.

In this embodiment, the bump rubber section 19 and the support section 16 are fixed together by vulcanization or other means. In addition, the bump rubber section 19 and the receiving rubber section 18 are integrally formed.

As illustrated in FIG. 1, in this embodiment, the bump rubber section 19 is connected to the rubber part of the laminated section 14 (more specifically, in the example illustrated in FIG. 1, the rubber membrane 143) via an annular connecting rubber section 25 that covers the inner circumferential surface of the support section 16. The inner circumferential surface of the connecting rubber section 25 is separated from the outer circumferential surface of the damper rod 121 to the outer circumferential side.

However, the connecting rubber section 25 does not have to be provided.

The dust cover section 20 is made of rubber. The dust cover section 20 is configured as a cylinder in shape and is arranged on the outer circumferential side of the extension and retraction section 12. The dust cover section 20 protects the extension and retraction section 12 from external damage and dust.

In this embodiment, the dust cover section 20 extends downwards from the outer circumferential end portion of the lower end portion of the bump rubber section 19. In addition, the dust cover section 20 is located between the cylinder 122 and the suspension spring section 17 in the axis right-angle direction. The inner diameter of the dust cover section 20 is larger than the outer diameter of the cylinder 122.

In this embodiment, the dust cover section 20 has one or more (in the example of FIG. 1, a plurality of) ribs 201 protruding toward the outer circumferential side on the outer circumferential surface thereof. It is preferable for the rib 201 to extend along the circumferential direction. This allows the dust cover section 20 to improve the strength thereof even if the dust cover section 20 is made of rubber.

However, the configuration of the dust cover section 20 can be arbitrary.

In this embodiment, the anti-vibration device 1 comprises an integrally formed article 24. The integrally formed article 24 is an article in which a plurality of components are integrally formed as a single part by rubber injection molding. The rubber in each of the rubber parts of the integrally formed article 24 is all the same composition of rubber. In this embodiment, the integrally formed article 24 is formed by combining a component made of rubber with a component made of a rigid body (metal, etc.), and more specifically, it has the strut mount section 13, the laminated section 14, the support section 16, the connecting rubber section 25, the bump rubber section 19, the receiving rubber section 18, and the dust cover section 20. The anti-vibration device 1 comprises the integrally formed article 24, which enables cost reduction by reducing the number of parts and the number of assembly man-hours.

However, the integrally formed article 24 may have any number of components of the rubber anti-vibration device 1, as long as it includes at least a component made of rubber. Even in such cases, it is possible to reduce costs by reducing the number of parts and the number of assembly man-hours.

In general, there is a high demand for simple, inexpensive structures in relatively inexpensive, lightweight vehicles such as micromobility vehicles. The integrally formed articles 24 can meet such demands.

Second Embodiment

Figure 3:
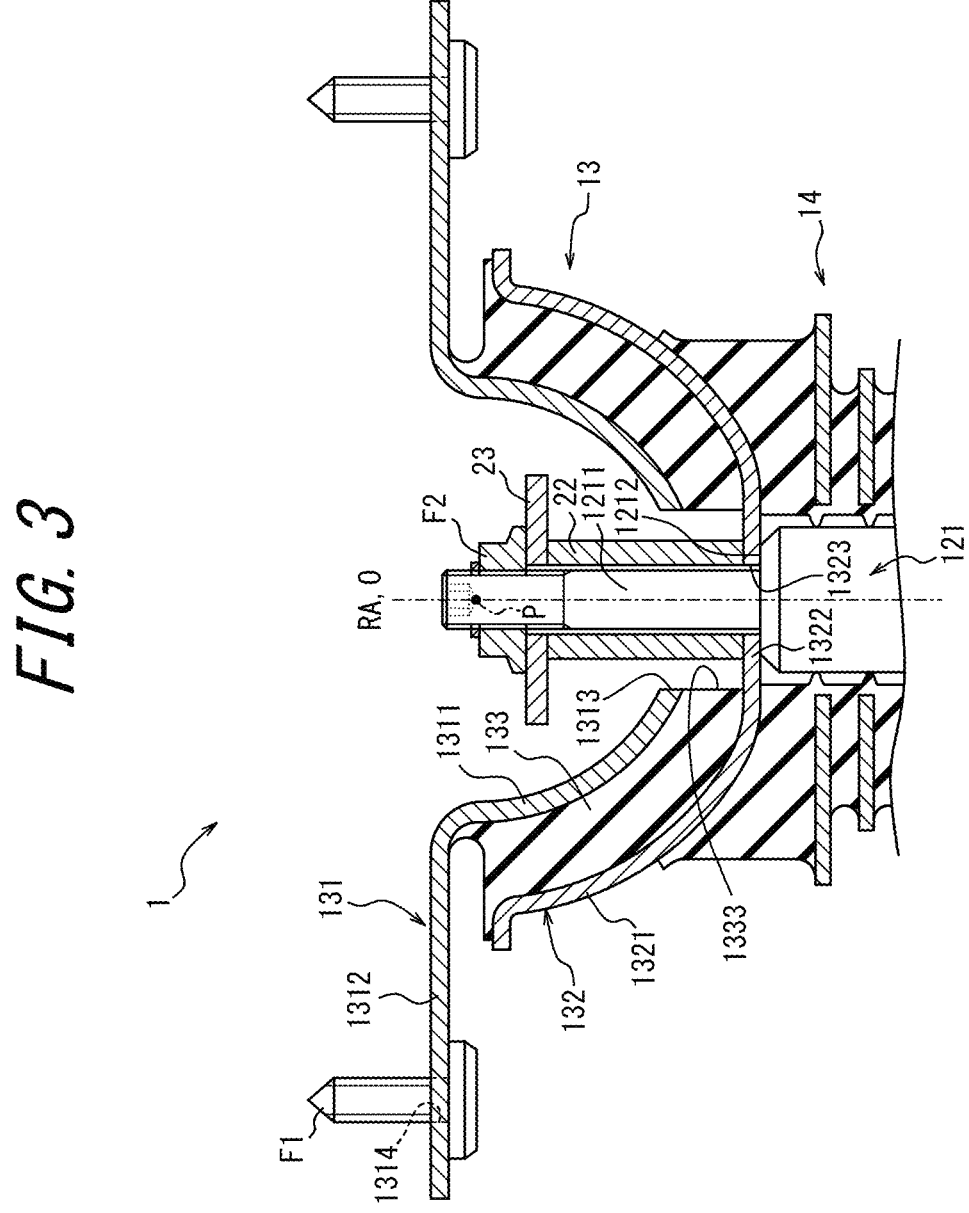
FIG. 3 is a longitudinal cross-sectional view illustrating an anti-vibration device according to a second embodiment of the present disclosure.

In each embodiment described in this document, the anti-vibration device 1 may comprise a detent plate 23, as in the second embodiment illustrated in FIG. 3. The detent plate 23 is configured in an annular shape and is attached to the mounting part 1211 of the damper rod 121. The outer diameter of the detent plate 23 is larger than the diameter of the central through hole 1323 of the bracket 131. The detent plate 23 is located above the central through hole 1323 of the bracket 131. This allows the detent plate 23 to prevent the broken or separated part from coming off the mounting part 1211 of the damper rod 121 if the strut mount section 13 or the laminated section 14 breaks or separates due to poor rubber adhesion, etc.

In the embodiment illustrated in FIG. 3, the anti-vibration device 1 comprises a cylindrical sleeve 22 provided between the mounting part 1322 of the mounting member 132 and the detent plate 23. The detent plate 23 is sandwiched between the sleeve 22 and the fastener F2.

Third Embodiment

Figure 4:
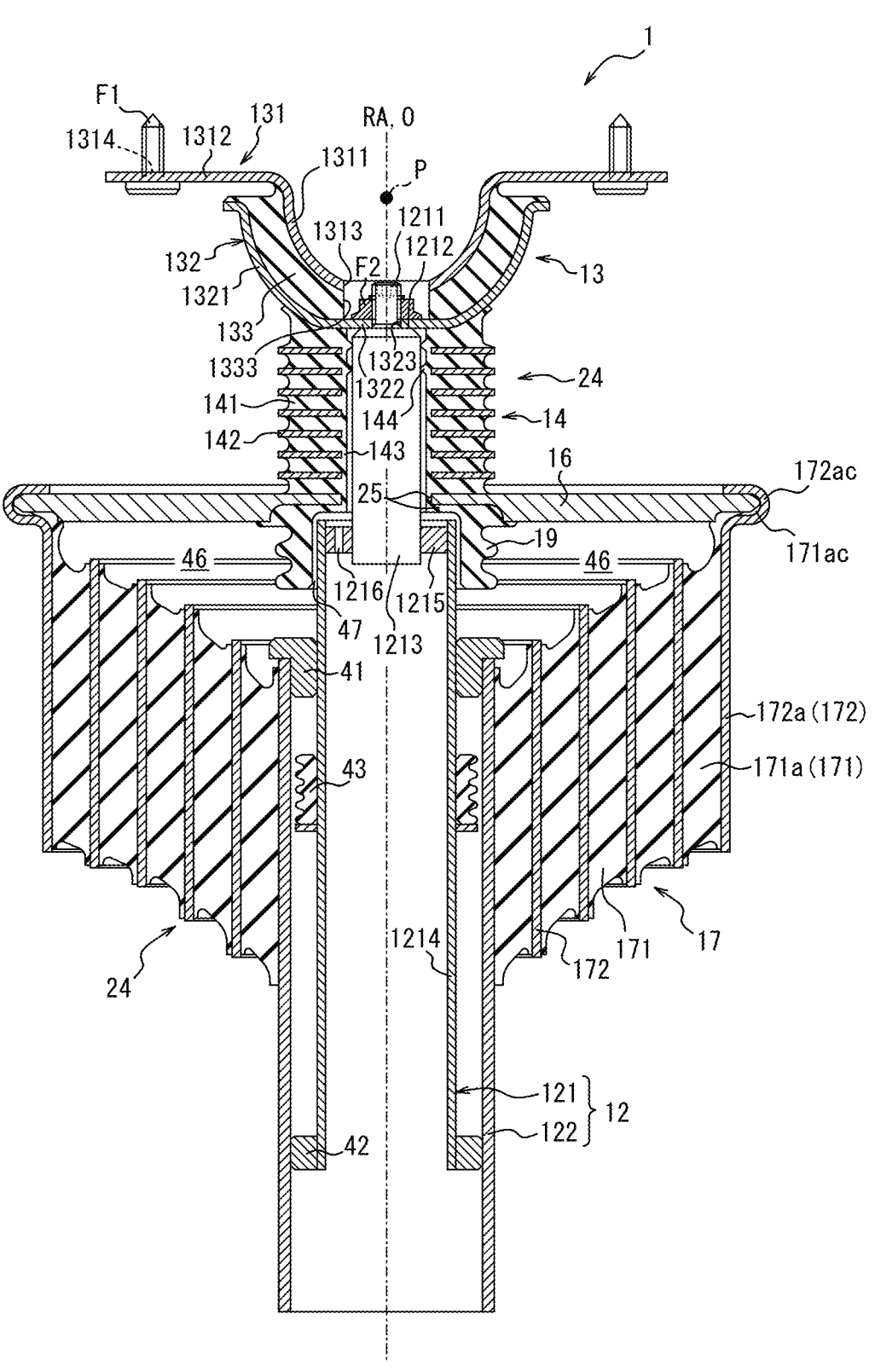
FIG. 4 is a longitudinal cross-sectional view illustrating an anti-vibration device according to a third embodiment of the present disclosure.
Figure 5:
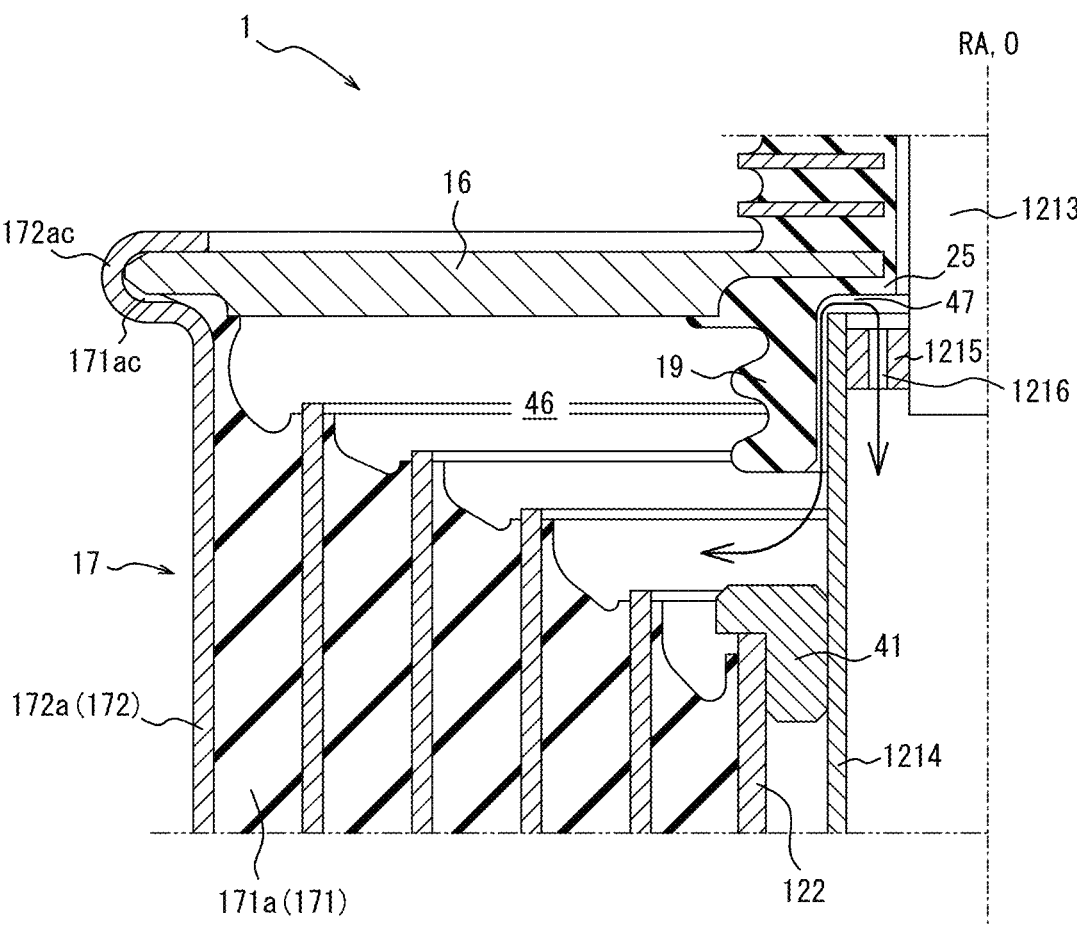
FIG. 5 is a drawing that explains the operation of the anti-vibration device illustrated in FIG. 4.
Figure 6:
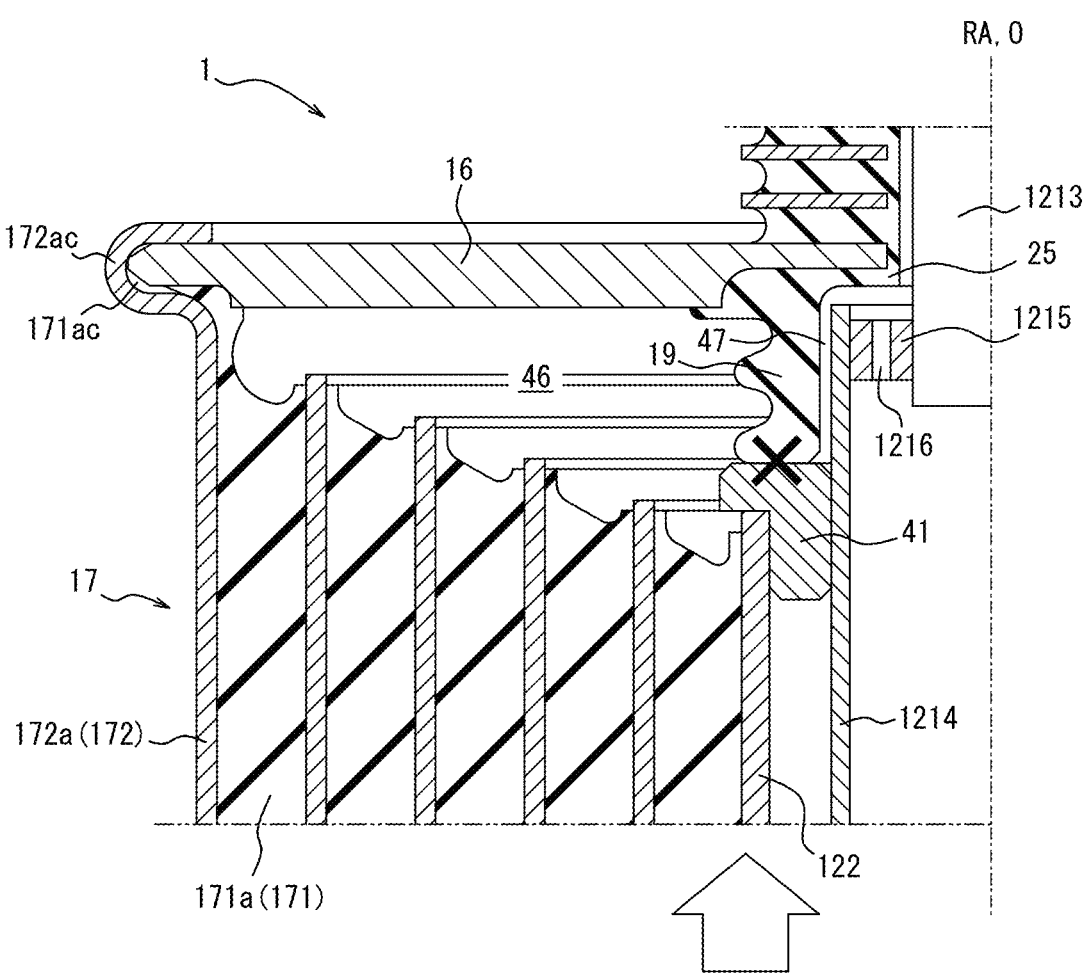
FIG. 6 is a drawing that explains the operation of the anti-vibration device illustrated in FIG. 4.

FIGS. 4 to 6 are drawings to explain the anti-vibration device 1 according to the third embodiment of the present disclosure. The third embodiment is mainly different from the first embodiment in the configuration of the suspension spring section 17 and the extension and retraction section 12. The configuration of the strut mount section 13 and the laminated section 14 may be the same as that described above for the first embodiment.

The following explanation focuses on the points that differ from the first embodiment. Other points may be same as those described above in relation to the first embodiment.

As illustrated in FIG. 4, in the third embodiment, the suspension spring section 17 is configured to include rubber. More specifically, the suspension spring section 17 has a cylindrical rubber layer 171 and a cylindrical rigid layer 172 that are laminated alternately along the radial direction. The suspension spring section 17 has one or more cylindrical rubber layers 171 and one or more cylindrical rigid layers 172. The cylindrical rubber layer 171 and the cylindrical rigid layer 172 are each configured as a cylinder in shape that is coaxial with the anti-vibration device axis O (and thus, the rod axis RA). Each cylindrical rubber layer 171 is connected between the outer circumferential surface of the cylinder 122 and the outermost cylindrical rigid layer 172a. The cylindrical rubber layer 171 is made of rubber. The cylindrical rigid layer 172 is made of a rigid material such as metal.

The inner circumferential end portion of the suspension spring section 17 is composed of the cylindrical rubber layer 171, and the inner circumferential surface of the cylindrical rubber layer 171 is connected to the outer circumferential surface of the cylinder 122. The outer circumferential end portion of the suspension spring section 17 is composed of the cylindrical rigid layer 172 (hereafter, also referred to as the "outermost cylindrical rigid layer 172a"). The outermost cylindrical rigid layer 172a is arranged at a position that is separated from the extension and retraction section 12 to the outer circumference side. The upper end portion 172ac of the outermost cylindrical rigid layer 172a is connected to the support section 16 by being fixed to the outer circumferential end portion of the support section 16 using a method such as caulking. As a result, the support section 16 supports the upper end portion of the suspension spring section 17.

In the example illustrated in FIG. 4, the upper end portion 171ac of the cylindrical rubber layer 171a, which is in contact with the inner circumferential surface of the outermost cylindrical rigid layer 172a, is located between the outer end portion of the support section 16 and the upper end portion 172ac of the outermost cylindrical rigid layer 172a, and is connected to the support section 16 by being fixed to the outer end portion of the support section 16 using a method such as caulking together with the upper end portion 172ac of the outermost cylindrical rigid layer 172a. This helps to reduce air leakage and improve airtightness at the connection between the support section 16 and the suspension spring section 17.

The suspension spring section 17 is loaded with a weight equivalent to that of a vehicle.

In this embodiment, the cylindrical rubber layer 171 and the cylindrical rigid layer 172, as well as the cylindrical rubber layer 171 and the cylinder 122, are fixed together by vulcanization or other means.

In addition, the suspension spring section 17 may have only the outermost cylindrical rigid layer 172a as the cylindrical rigid layer 172. In this case, the suspension spring section 17 has a single-layer structure with only one cylindrical rubber layer 171, and this cylindrical rubber layer 171 connects the outer circumferential surface of the cylinder 122 to the outermost cylindrical rigid layer 172a. However, as illustrated in the example in FIG. 4, by having a laminated structure with the cylindrical rigid layer 172 in addition to the outermost cylindrical rigid layer 172a, it is possible to increase the rigidity in the axis right-angle direction.

In the third embodiment, the extension and retraction section 12 has a different structure to conventional shock absorbers.

The damper rod 121 has a solid part 1213 which is solidly configured, a cylindrical section 1214 which is configured in a cylindrical shape, and a connecting section 1215.

The outer diameter of the cylindrical section 1214 is larger than the outer diameter of the solid part 1213. The upper end portion of the cylindrical section 1214 is connected to the lower end portion of the solid part 1213 via the connecting section 1215. The connecting section 1215 is configured as an annular shape that is coaxial with the rod axis RA, and this seals the gap between the solid part 1213 and the cylindrical section 1214. The connecting section 1215 has a rod upper-side hole 1216 that penetrates the connecting section 1215 in the axial direction. The lower end face of the cylindrical section 1214 is open.

As in the first embodiment, the strut mount section 13, the laminated section 14, the support section 16, and the connecting rubber section 25 are arranged on the outer circumferential side of the solid part 1213.

The fact that the outer diameter of the cylindrical section 1214 is larger than the outer diameter of the solid part 1213 makes the damper rod 121 more rigid than it would be if the outer diameter of the cylindrical section 1214 were the same as the outer diameter of the solid part 1213, and in turn makes the king pin more rigid.

An upper guide 41 is fixed to the upper end portion of the cylinder 122. The upper guide 41 is configured as an annular shape that is coaxial with the rod axis RA. The upper guide 41 is fixed to the inner circumferential surface of the cylinder 122 and is in contact with the outer circumferential surface of the cylindrical section 1214 of the damper rod 121, and is configured to be able to slide on the outer circumferential surface of the cylindrical section 1214 of the damper rod 121.

The upper guide 41 is suitably made of a rigid material such as metal.

It is preferable that the inner circumferential surface of the upper guide 41 is coated with a resin such as Teflon, since it will be easier for the upper guide to slide on the outer circumferential surface of the cylindrical section 1214 of the damper rod 121.

In the example illustrated in FIG. 4, the upper guide 41 covers the upper end face of the cylinder 122 from above, and thereby allows the upper end portion of the cylinder 122 to hit the lower surface of the bump rubber section 19 via the upper guide 41 during the extension and retraction operation of the extension and retraction section 12.

However, the upper guide 41 does not have to cover the upper end face of the cylinder 122, and the upper end portion of the cylinder 122 may be made so that it can directly contact the lower surface of the bump rubber section 19.

A lower guide 42 is fixed to the lower end portion of the cylindrical section 1214 of the damper rod 121. The lower guide 42 is configured as an annular shape that is coaxial with the rod axis RA. The lower guide 42 is fixed to the outer circumferential surface of the cylindrical section 1214 of the damper rod 121 and is in contact with the inner circumferential surface of the cylinder 122, and is configured to be able to slide on the inner circumferential surface of the cylinder 122. The lower guide 42 is located below the upper guide 41.

The lower guide 42 is suitably made of a rigid material such as metal.

It is preferable that the outer circumferential surface of the lower guide 42 is coated with a resin such as Teflon, since it will be easier for the lower guide to slide on the inner circumferential surface of the cylinder 122.

The upper guide 41 and the lower guide 42 allow the cylinder 122 and the damper rod 121 to move smoothly in the axial direction relative to each other while maintaining a coaxial state.

A stopper rubber 43 is fixed on the outer circumferential surface of the cylindrical section 1214 of the damper rod 121, between the upper guide 41 and the lower guide 42. The stopper rubber 43 is made of rubber.

The top surface of the stopper rubber 43 is configured so that it can come into contact with the bottom surface of the upper guide 41 during the extension and retraction operation of the extension and retraction section 12.

The stopper rubber 43 is configured to restrict the further relative movement downwards of the cylinder 122 (and thereby stop the extension stroke of the extension and retraction section 12) by causing the lower surface of the upper guide 41 to come into contact with the upper surface of the stopper rubber 43 when the cylinder 122 moves a certain distance downward relative to the damper rod 121.

In this embodiment, the outer circumferential surface of the stopper rubber 43 has a wave shape that oscillates in the axis right-angle direction in a cross-section along the axial direction, as illustrated in FIG. 4. However, the shape of the stopper rubber 43 may be arbitrary.

In this embodiment, the outer circumferential surface of the stopper rubber 43 is separated from the inner circumferential surface of the cylinder 122 to the inner circumferential side.

The internal space of the extension and retraction section 12 is filled with air.

In the third embodiment, as in the first embodiment, the lower end portion of the cylinder 122 is connected to a knuckle (not illustrated in a figure).

A main air chamber 46 is partitioned by the support section 16, the suspension spring section 17, and the extension and retraction section 12. The main air chamber 46 is filled with air.

In the third embodiment, as illustrated in FIG. 4, the bump rubber section 19 is located on the outer circumferential side of the upper end portion of the cylindrical section 1214 of the damper rod 121. The connecting rubber section 25, which connects the rubber part of the laminated section 14 (in the example in FIG. 4, the rubber membrane 143) and the bump rubber section 19, is located on the outer circumferential side of the solid part 1213 of the damper rod 121. The connecting rubber section 25 covers the inner circumferential surface of the support section 16, and also covers the under surface of the support section 16 on the inner circumferential side of the bump rubber section 19. The connecting section 1215 and the cylindrical section 1214 of the damper rod 121 are located below the connecting rubber section 25.

There is a gap between the connecting rubber section 25, and the connecting section 1215 and the cylindrical section 1214 of the damper rod 121. In addition, there is a gap between the bump rubber section 19 and the cylindrical section 1214 of the damper rod 121. These gaps form a passage 47 that connects the rod upper-side hole 1216 with the main air chamber 46.

In the third embodiment, the integrally formed article 24 has the strut mount section 13, the laminated section 14, the support section 16, the connecting rubber section 25, and the bump rubber section 19. In addition, the suspension spring section 17 constitutes another integrally formed article 24. The anti-vibration device 1 comprises the integrally formed article 24, which makes it possible to reduce costs by reducing the number of parts and the number of assembly man-hours.

In the third embodiment configured as described above, under normal circumstances, as illustrated in FIG. 5, the upper end portion of the cylinder 122 (more specifically, the upper surface of the upper guide 41) is separated from the lower surface of the bump rubber section 19 to the lower side. As a result, the main air chamber 46 becomes an air chamber that is open via the passage 47, and more specifically, air can flow in and out between the internal space of the cylindrical section 1214 of the damper rod 121 and the main air chamber 46 via the passage 47 and the rod upper-side hole 1216.

On the other hand, when a large retraction stroke occurs, for example when a vehicle overcomes a large bump, as illustrated in FIG. 6, the upper end portion of the cylinder 122 collides (and thus, comes into contact) with the lower surface of the bump rubber section 19 via the upper guide 41. In this state, the main air chamber 46 is blocked off from the passage 47, and the main air chamber 46 becomes a closed (airtight) space. Then, during this collision, the upper end portion of cylinder 122 attempts to compress the bump rubber section 19 via the upper guide 41, while the part of the suspension spring section 17 between the cylinder 122 and the outermost cylindrical rigid layer 172a attempts to displace upwards due to inertia and elastic deformation. As a result, the main air chamber 46 is gradually compressed, the internal pressure increases, and the air spring functions. The impact of the collision between the cylinder 122 and the bump rubber section 19 is mitigated by the air reaction force from the main air chamber 46 and the elastic reaction force from the bump rubber section 19, and the retraction stroke of the extension and retraction section 12 is gradually stopped. Therefore, it is possible to improve the ride comfort when a large retraction stroke occurs.

In addition, in the third embodiment, the suspension spring section 17 has the cylindrical rubber layer 171, as described above, connected between the outer circumferential surface of the cylinder 122 and the inner circumferential surface of the outermost cylindrical rigid layer 172*a*, and the upper end portion 172*ac* of the outermost cylindrical rigid layer 172*a* is connected to the support section 16. As a result, the suspension spring section 17 can easily extend and retract in the up-down direction, and can also rotationally displace (extend and retract) easily in the circumferential direction. For this reason, the suspension spring section 17 of this embodiment has the same function as a conventional coil spring that could constitute the suspension spring section 17 of the first embodiment, for example. Therefore, a coil spring is not required. Conventionally, when using a coil spring, in order to prevent it from falling out when it breaks due to corrosion or repeated loading, it is necessary to have a structure that firmly fixes the upper and lower end portions of the coil spring, and to install a guard on the part that receives the lower end portion of the coil spring. These can lead to increased costs and weight. In the case of the suspension spring section 17 of this embodiment, such a structure is not necessary, and costs and weight can be reduced. Furthermore, the suspension spring section 17 has the cylindrical rubber layer 171, therefore, it also has the vibration damping function of a conventional shock absorber, which could, for example, be used to constitute the extension and retraction section 12 of the first embodiment. Therefore, a shock absorber (or more specifically, the viscous fluid that is generally sealed inside the shock absorber) is no longer necessary, and it is no longer necessary to seal viscous fluid inside the extension and retraction section 12. Accordingly, the configuration of this embodiment reduces costs and the number of assembly man-hours compared to using a coil spring and a shock absorber.

Forth Embodiment

Figure 7:
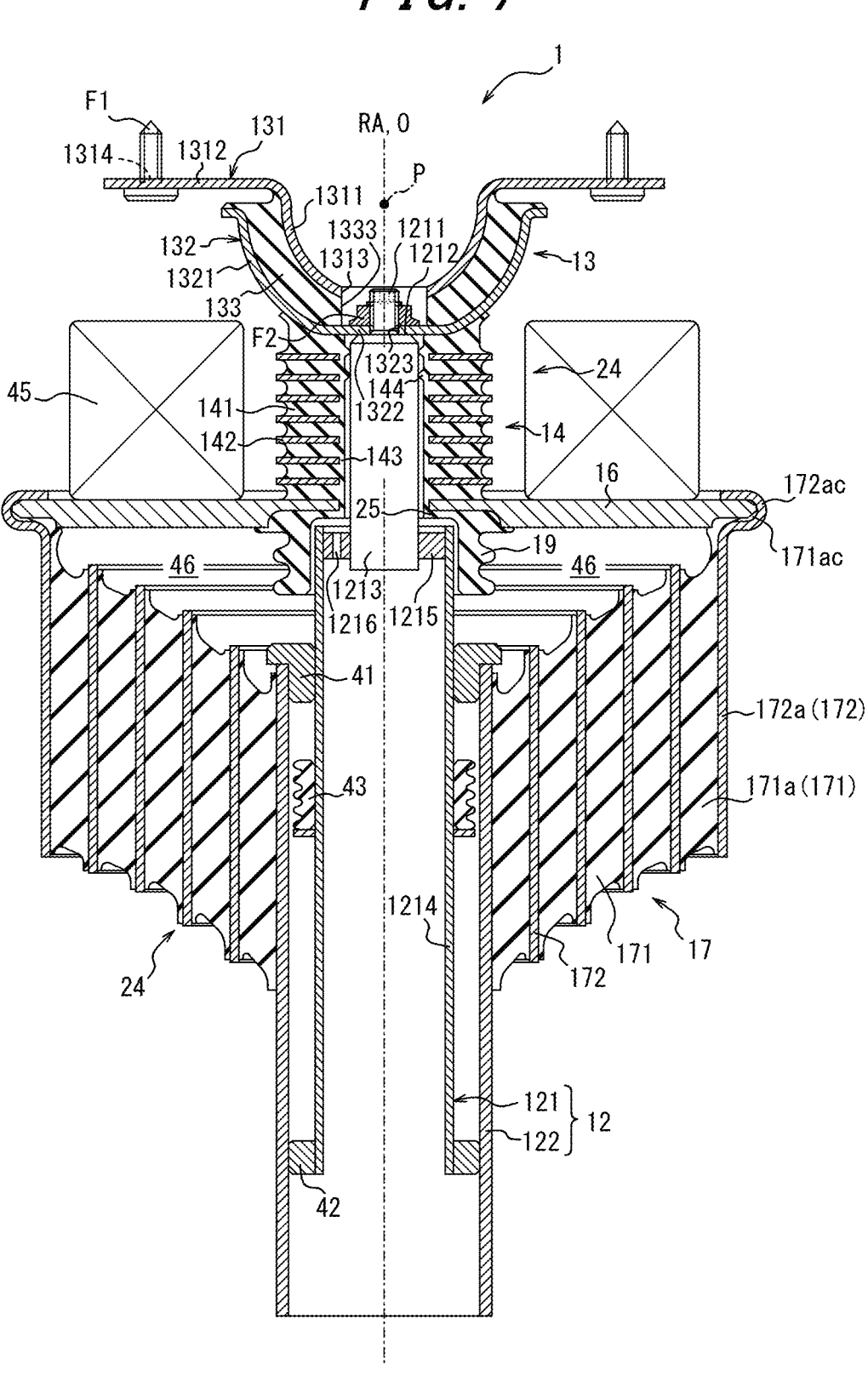
FIG. 7 is a longitudinal cross-sectional view illustrating an anti-vibration device according to a fourth embodiment of the present disclosure.

In each embodiment described in this document, the anti-vibration device 1 may be provided with a weight 45, as in the fourth embodiment illustrated in FIG. 7. In the example in FIG. 7, the weight 45 is installed on the support section 16.

In general, due to the nature of rubber, when micro (high-frequency) vibrations such as road noise occur, the stiffness of the rubber parts of an anti-vibration device tend to increase due to the Payne effect, making it easier for the small vibrations to be transmitted.

In this respect, by installing the weight 45 as mentioned above, when micro-vibrations such as road noise occur, the weight 45 can effectively absorb the micro-vibrations, and the double anti-vibration effect can reduce the noise inside the car.

Fifth Embodiment

Figure 8:
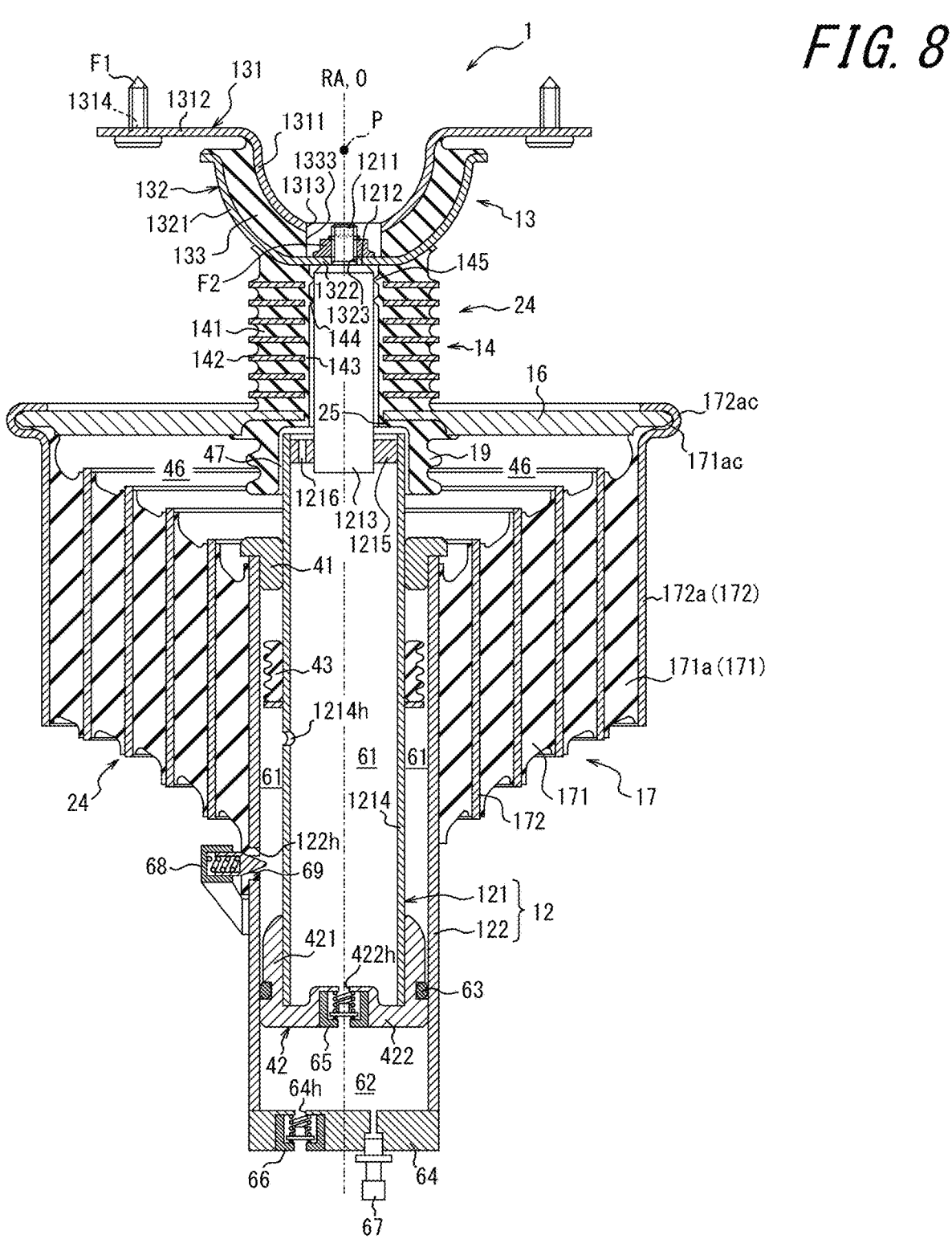
FIG. 8 is a longitudinal cross-sectional view illustrating an anti-vibration device according to a fifth embodiment of the present disclosure.
Figure 9:
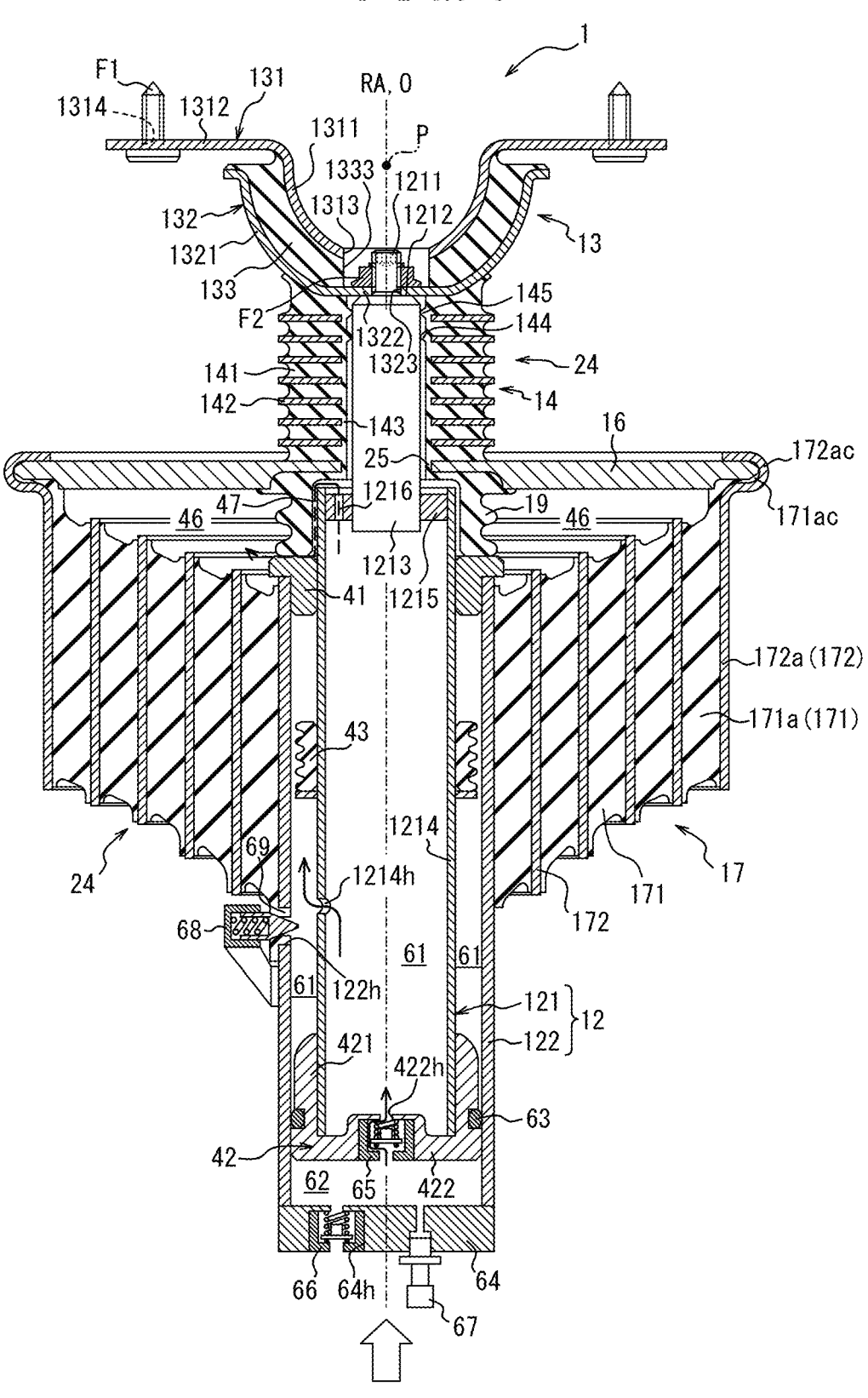
FIG. 9 is a drawing that explains the operation of the anti-vibration device illustrated in FIG. 8.
Figure 10:
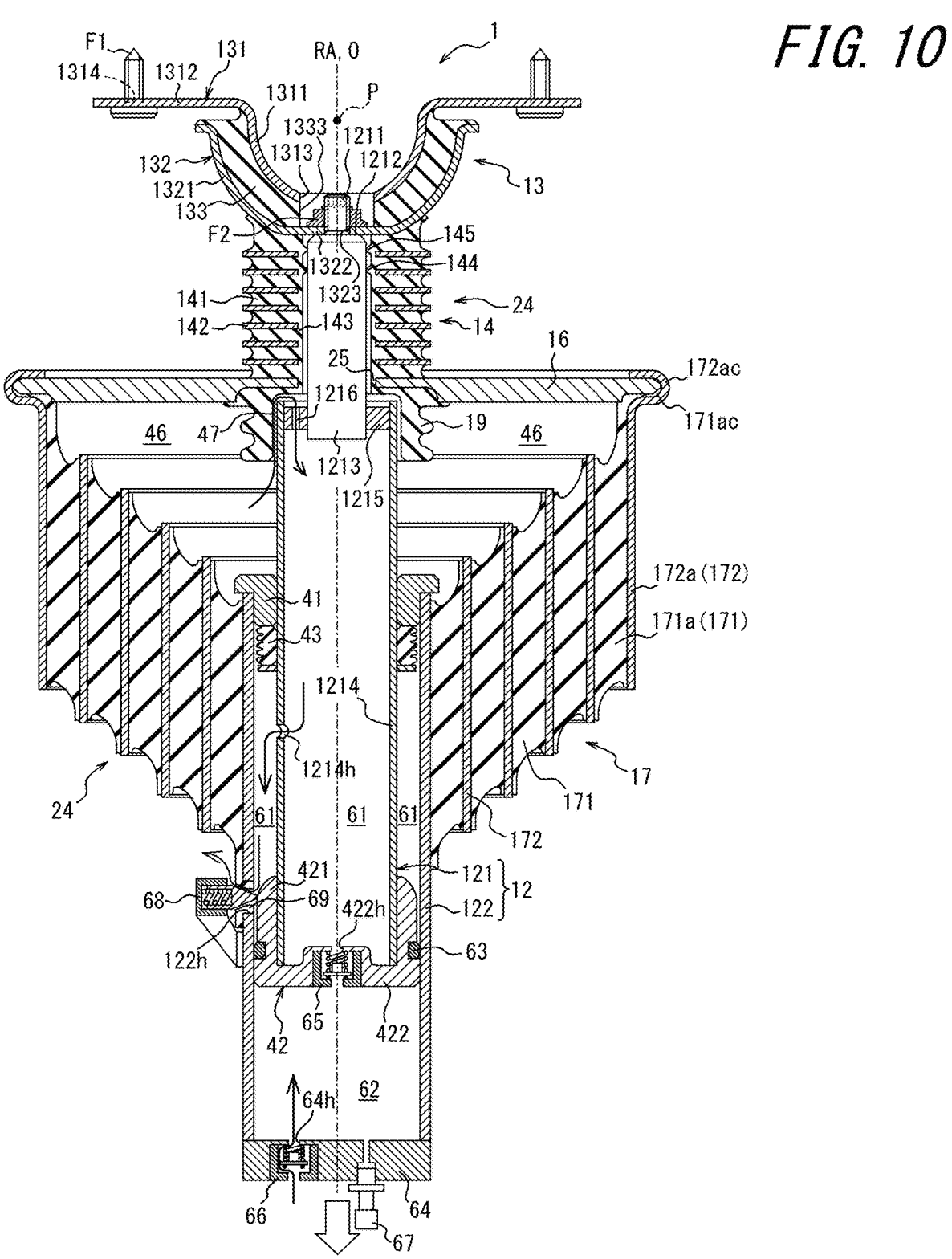
FIG. 10 is a drawing that explains the operation of the anti-vibration device illustrated in FIG. 8.

FIGS. 8 to 10 are drawings to explain the anti-vibration device 1 according to the fifth embodiment of the present disclosure. The fifth embodiment mainly differs from the third embodiment in the configuration of the extension and retraction section 12. The configuration of the strut mount section 13, the laminated section 14, the suspension spring section 17, the bump rubber section 19, and the connecting rubber section 25 may be the same as that described above for the third embodiment.

The following explanation focuses on the points that differ from the third embodiment. Other points may be the same as those mentioned above for the third embodiment.

In the fifth embodiment, the extension and retraction section 12 has an upper guide 41 and a stopper rubber 43, and their configuration is the same as in the third embodiment.

In the fifth embodiment, the extension and retraction section 12 has a lower guide 42, as in the third embodiment. The lower guide 42 is fixed to the lower end portion of the cylindrical section 1214 of the damper rod 121. The lower guide 42 is suitably made of a rigid material such as metal.

In this embodiment, the lower guide 42 has a lid part 422 and a push part 421.

The lid part 422 seals the open end face on the lower side of the cylindrical section 1214 of the damper rod 121 and the gap between the cylindrical section 1214 and the cylinder 122. In addition, the lid part 422 is in contact with the inner circumferential surface of the cylinder 122 and is configured to be able to slide on the inner circumferential surface of the cylinder 122. It is preferable that the outer circumferential surface of the lid part 422 is coated with a resin such as Teflon, since it will be easier for the lid part to slide on the inner circumferential surface of the cylinder 122.

The push part 421 extends upwards from the lid part 422 between the cylindrical section 1214 and the cylinder 122. The push part 421 is configured so that it can push a release valve 68.

The cylindrical section 1214 of the damper rod 121 has a transverse hole 1214*h* that penetrates the cylindrical section 1214 in the radial direction between the stopper rubber 43 and the release valve 68 in the axial direction.

In the fifth embodiment, the extension and retraction section 12 has a cylinder lid member 64. The cylinder lid member 64 seals the open end face on the lower side of the cylinder 122.

The interior of the extension and retraction section 12 is divided into an intermediate air chamber 61 and an under-rod air chamber 62.

The intermediate air chamber 61 has an internal space that is partitioned between the connecting section 1215 and the lower guide 42 in the axial direction inside the cylindrical section 1214 of the damper rod 121; and an internal space that is partitioned between the upper guide 41 and the lower guide 42 in the axial direction between the cylindrical section 1214 and the cylinder 122, and these internal spaces are connected via the transverse hole 1214*h*.

The under-rod air chamber 62 is partitioned between the lower guide 42 and the cylinder lid member 64 in the axial direction inside the cylinder 122.

The damper rod 121 and the lower guide 42, as a single unit, have the function of a piston that slides inside the cylinder 122.

As illustrated in FIG. 8, it is preferable that a sealing member 63, such as an O-ring, is provided between the outer circumferential surface of the lower guide 42 and the inner circumferential surface of the cylinder 122. The sealing member 63 is in the form of an annular shape that extends along the circumferential direction throughout the entire circumference, and is housed in the annular groove formed on the outer circumferential surface of the lower guide 42. This improves the air-tightness between the lower guide 42 and the cylinder 122, and suppresses any unwanted air flow between the intermediate air chamber 61 and the under-rod air chamber 62.

The lid part 422 of the lower guide 42 has a through hole 422*h* that penetrates the lid part 422. The through hole 422*h* connects the intermediate air chamber 61 to the under-rod air chamber 62. A rod one-way valve 65 is provided in the through hole 422*h*. The rod one-way valve 65 is configured to allow air to flow from the under-rod air chamber 62 to the intermediate air chamber 61 via the through hole 422*h*, while preventing air from flowing from the intermediate air chamber 61 to the under-rod air chamber 62 via the through hole 422*h*.

The cylinder lid member 64 has a through hole 64*h* that penetrates the cylinder lid member 64. The through hole 64*h* is connected to the under-rod air chamber 62 and the outside of the cylinder 122. A cylinder one-way valve 66 is provided in the through hole 64*h*. The cylinder one-way valve 66 is configured to allow air to flow from the outside of the cylinder 122 to the under-rod air chamber 62 via the through hole 64*h*, while preventing air from flowing from the under-rod air chamber 62 to the outside of the cylinder 122 via the through hole 64*h*.

The cylinder 122 has a through hole 122*h* that penetrates the cylinder in the radial direction. In the example illustrated in FIG. 8, the inner surface of the through hole 122*h* is covered by a cylindrical rubber membrane 69. The rubber membrane 69 is connected as one piece with the cylindrical rubber layer 171 of the suspension spring section 17, however, it may also be configured separately from the cylindrical rubber layer 171.

A release valve 68 is provided in the through hole 122*h*. The rubber membrane 69 is interposed between the inner surface of the through hole 122*h* and the release valve 68. This helps to reduce unwanted air leakage between the through hole 122*h* and the release valve 68, and improves airtightness. However, the rubber membrane 69 is not necessary.

The release valve 68 is configured so that when it is pushed from the inner circumferential side by the push part 421 of the lower guide 42, a gap is formed between the inner surface of the through hole 122*h* and the release valve 68, and the intermediate air chamber 61 is connected to the outside of the cylinder 122.

The laminated section 14 has an annular protrusion 145 that protrudes from the inner circumferential surface to the inner circumferential side. The annular protrusion 145 is configured in an annular shape that extends along the circumferential direction throughout the entire circumference. The tip portion of the annular protrusion 145 is in contact with the outer circumferential surface of the solid part 1213 of the damper rod 121. The annular protrusion 145 maintains the laminated section 14 in the same axis as the damper rod 121, and also seals airtight the space between the laminated section 14 and the solid part 1213 of the damper rod 121.

In this embodiment, the annular protrusion 145 is made of rubber.

In addition to the annular protrusion 145, the anti-vibration device 1 may also have a plurality of protrusions 144.

In the fifth embodiment, which is configured as described above, it operates as follows.

During the retraction stroke, as illustrated in FIG. 9, after the cylinder 122 has moved relative to the damper rod 121 upwards, the upper end portion of the cylinder 122 collides (and thus, comes into contact) with the lower surface of the bump rubber section 19 via the upper guide 41. While the cylinder 122 moves relative to damper rod 121 upwards, the pressure in the under-rod air chamber 62 increases, causing the rod one-way valve 65 to open, and air flows from the under-rod air chamber 62 to the intermediate air chamber 61 via the rod one-way valve 65. As a result, air flows from the intermediate air chamber 61 to the main air chamber 46 via the rod upper-side hole 1216 and the passage 47. In this way, the extension and retraction section 12 is configured to supply air to the main air chamber 46 during the retraction stroke. When the retraction stroke is large, for example, due to the vehicle overcoming a large bump, etc., then, as in the third embodiment, the cylinder 122 will collide (and thus, comes into contact) with the bump rubber section 19 via the upper guide 41, the main air chamber 46 will be blocked off from the passage 47, and the main air chamber 46 will become a closed (airtight) space. During this collision, the upper end portion of the cylinder 122 attempts to compress the bump rubber section 19 via the upper guide 41, while the part of the suspension spring section 17 between the cylinder 122 and the outermost cylindrical rigid layer 172*a* attempts to displace upwards due to inertia and elastic deformation. As a result, the main air chamber 46 is gradually compressed, the internal pressure increases, and the air spring functions. The impact of the collision between the cylinder 122 and the bump rubber section 19 is mitigated by the air reaction force from the main air chamber 46 and the elastic reaction force from the bump rubber section 19 that arise in this way, and the retraction stroke of the extension and retraction section 12 is gradually stopped.

On the other hand, during the extension stroke, as illustrated in FIG. 10, the pressure in the under-rod air chamber 62 decreases, the cylinder one-way valve 66 opens, and air from the outside flows into the under-rod air chamber 62 via the cylinder one-way valve 66.

In this way, while the retraction and extension strokes are repeated, the anti-vibration device 1 continues to pump air into the internal space (the main air chamber 46, the intermediate air chamber 61, the under-rod air chamber 62) through the above-mentioned pump action, and the pressure in the internal space increases.

When the pressure in the internal space of the anti-vibration device 1 (the main air chamber 46, the intermediate air chamber 61, the under-rod air chamber 62) reaches a certain level (roughly speaking, when the pressure in the internal space and the reaction force of the suspension spring section 17 exceed the load of the entire anti-vibration device 1), the extension and retraction section 12 extends and the push part 421 of the lower guide 42 pushes the release valve 68, thereby releasing the release valve 68 and causing the air in the main air chamber 46 and the intermediate air chamber 61 to flow outwards. This causes the pressure in the main air chamber 46 and the intermediate air chamber 61 to drop. After that, when the pressure in the main air chamber 46 and the intermediate air chamber 61 drops to a certain level, the push part 421 of the lower guide 42 moves away from the release valve 68, and the release valve 68 returns to its closed state.

In this way, the anti-vibration device 1 automatically stabilizes the pressure in the internal space to a state within the specified pressure range (roughly speaking, a state where the air reaction force due to the pressure in the internal space and the elastic reaction force due to the suspension spring section 17 support the load of the entire anti-vibration device 1), thereby making it possible to maintain the vehicle height within the specified vehicle height range. In other words, the anti-vibration device 1 has a self-leveling function that automatically adjusts the vehicle height. In order to achieve this self-leveling function, there is no need for external pumps, tanks, control devices, etc., so this makes it possible to reduce costs. According to this embodiment, the displacement of the suspension spring section 17 is minimized, and the 1G load is shared by the air pressure in the internal space of the anti-vibration device 1, which suppresses changes in vehicle height due to changes in loading, etc.

It will be noted that the above-mentioned specified vehicle height range can be adjusted by adjusting the configuration of the rod one-way valve 65 (for example, the pressing force of the spring inside the rod one-way valve 65, etc.).

In the fifth embodiment, as illustrated in FIG. 8, the anti-vibration device 1 may be provided with an adjustment valve 67. The adjustment valve 67 is configured to allow pressurized air from a pump (not illustrated in the figure) outside the anti-vibration device 1 to be injected into the internal space of the anti-vibration device 1 (the main air chamber 46, the intermediate air chamber 61, and/or the under-rod air chamber 62). As illustrated in FIG. 8, for example, the adjustment valve 67 may be provided in the cylinder lid member 64 and configured to allow pressurized air from an external pump (not illustrated in the figure) to be injected into the under-rod air chamber 62. By comprising the adjustment valve 67, for example, at the beginning of use or during maintenance, it is possible to adjust the vehicle height by injecting pressurized air from a pump (not illustrated in the figure) outside the anti-vibration device 1 into the internal space of the anti-vibration device 1 (the main air chamber 46, the intermediate air chamber 61, and/or the under-rod air chamber 62) using the adjustment valve 67.

Sixth Embodiment

Figure 11:
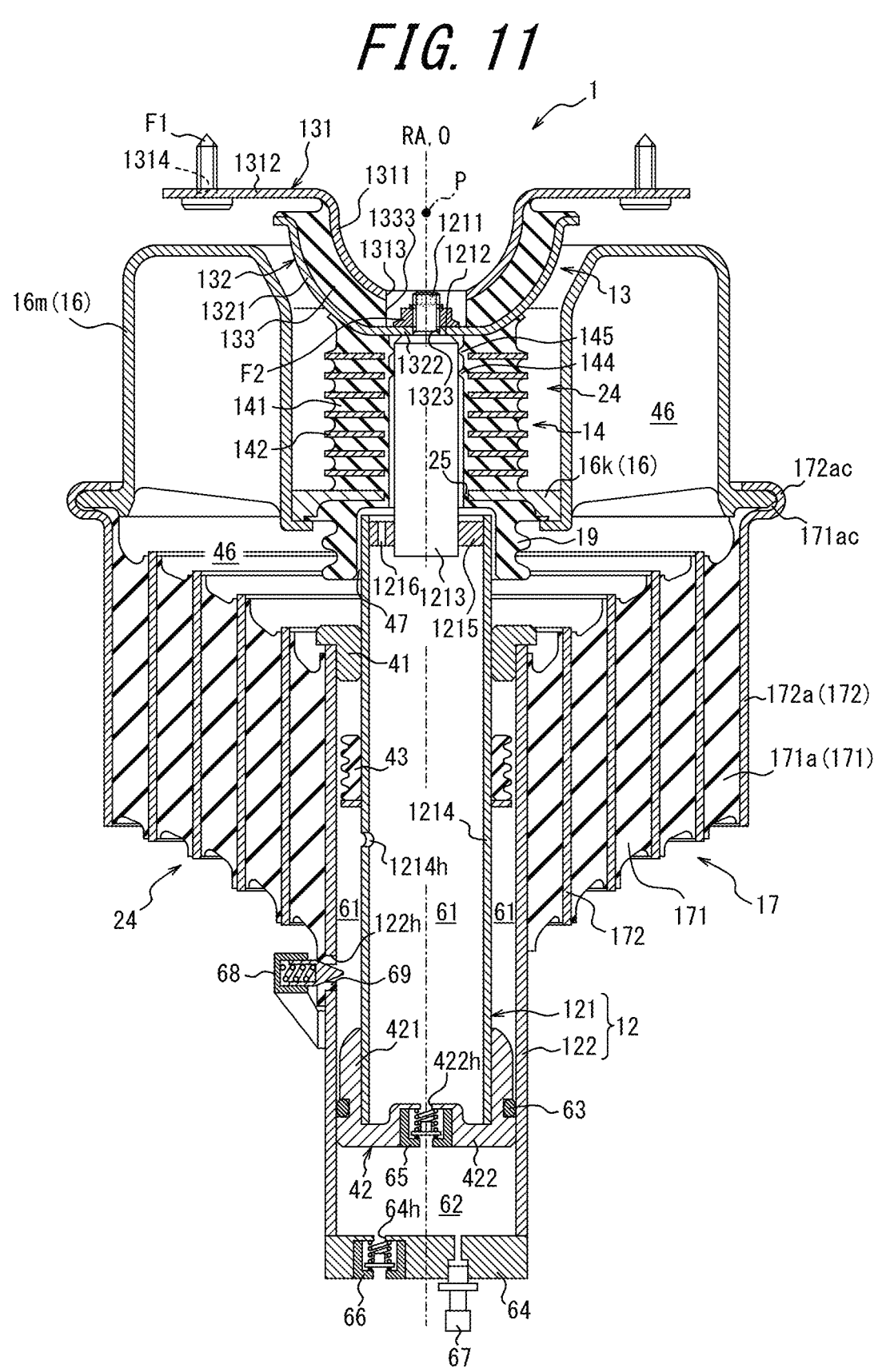
FIG. 11 is a longitudinal cross-sectional view illustrating an anti-vibration device according to a sixth embodiment of the present disclosure.

In each embodiment described in this document, when the anti-vibration device 1 has the main air chamber 46 described above, the support section 16 may have a main air chamber expansion part 16$m$, as in the sixth embodiment illustrated in FIG. 11.

In the example illustrated in FIG. 11, the support section 16 has an inner circumference part 16$k$ and the main air chamber expansion part 16$m$. The inner circumference part 16$k$ is connected between the laminated section 15 and the bump rubber section 19. The main air chamber expansion part 16$m$ is located on the outer circumferential side of the inner circumference part 16$k$, and in a cross-section in the axial direction illustrated in FIG. 11, it forms an approximately inverted U-shape that is convex on the top. The upper end of the main air chamber expansion part 16$m$ is above the upper end of the inner circumference part 16$k$.

The support section 16 has the main air chamber expansion part 16$m$, which allows the volume of the main air chamber 46 to be increased, and in turn, the performance of the air spring function demonstrated by the main air chamber 46 can be adjusted to improve ride comfort.

The inner circumference part 16$k$ and the main air chamber expansion part 16$m$ may be configured separately or as a single unit.

The configuration of the anti-vibration device 1 is not limited to the one described above, and various variations are possible.

INDUSTRIAL APPLICABILITY

The anti-vibration device according to this disclosure is suitable for use with strut suspensions, and is particularly suitable for use with MacPherson strut suspensions. In addition, the anti-vibration device according to this disclosure can be applied to any type of vehicle, but it is particularly suitable for relatively inexpensive and lightweight vehicles such as micromobility vehicles.

REFERENCE SIGNS LIST

1 Anti-vibration device
12 Extension and retraction section
121 Damper rod
1211 Mounting part
1212 Stepped surface
1213 Solid part
1214 Cylindrical section
1214$h$ Transverse hole
1215 Connecting section
1216 Rod upper-side hole
122 Cylinder
122$h$ Through hole
13 Strut mount section
131 Bracket
1311 Curved part
1312 Flange part
1313 Central through hole
1314 Fastening hole
132 Mounting member
1321 Curved part
1322 Mounting part
1323 Central through hole
133 Mount main body rubber
1333 Central through hole
14 Laminated section
141 Annular rubber layer
142 Annular rigid layer
143 Rubber membrane
144 Protrusion
145 Annular protrusion
16 Support section
16$k$ Inner circumference part
16$m$ Main air chamber expansion part
17 Suspension spring section
171, 171$a$ Cylindrical rubber layer
171$ac$ Upper end portion
172 Cylindrical rigid layer
172$a$ Outermost cylindrical rigid layer (Cylindrical rigid layer)
172$ac$ Upper end portion
18 Receiving rubber section
18$g$ Receiving groove
19 Bump rubber section
20 Dust cover section
201 Rib
21 Connecting rubber section
22 Sleeve
23 Detent plate
24 Integrally formed article
25 Connecting rubber section
41 Upper guide
42 Lower guide
421 Push part
422 Lid part
422$h$ Through hole
43 Stopper rubber
45 Weight
46 Main air chamber
47 Passage

61 Intermediate air chamber
62 Under-rod air chamber
63 Sealing member
64 Cylinder lid member
64h Through hole
65 Rod one-way valve
66 Cylinder one-way valve
67 Adjustment valve
68 Release valve
69 Rubber membrane
F1, F2 Fasteners
RA Rod axis
O Anti-vibration device axis
P Oscillate center point, Center point

The invention claimed is:

1. An anti-vibration device configured for use in a suspension, comprising an extension and retraction section having a damper rod and a cylinder;

a strut mount section attached to the damper rod;

a suspension spring section arranged on an outer circumferential side of the extension and retraction section;

a support section made of a rigid body and configured to support an upper end portion of the suspension spring section; and a laminated section arranged on an outer circumferential side of the damper rod and connected between the strut mount section and the support section, wherein the laminated section has an annular rubber layer and an annular rigid layer that are alternately laminated in an axial direction.

2. The anti-vibration device as described in claim 1, comprising an integrally formed article, wherein the integrally formed article has the strut mount section and the laminated section.

3. The anti-vibration device as described in claim 2, wherein the integrally formed article further has a bump rubber section arranged on an outer circumferential side of the damper rod and below the support section.

4. The anti-vibration device as described in claim 2, wherein the integrally formed article further has a dust cover section made of rubber, which is arranged on an outer circumferential side of the extension and retraction section.

5. The anti-vibration device as described in claim 1, wherein the suspension spring section has:

an outermost cylindrical rigid layer arranged on an outer circumferential side of the extension and retraction section; and a cylindrical rubber layer connected between an outer circumferential surface of the cylinder and an inner circumferential surface of the outermost cylindrical rigid layer, and an upper end portion of the outermost cylindrical rigid layer is connected to the support section.

6. The anti-vibration device as described in claim 5, wherein the anti-vibration device further comprises a bump rubber section arranged on an outer circumferential side of the damper rod and below the support section, and in a state where the upper end portion of the cylinder is in contact with the bump rubber section, a main air chamber, which is partitioned by the support section, the suspension spring section, and the extension and retraction section, becomes a closed space.

7. The anti-vibration device as described in claim 5, wherein the extension and retraction section is configured to supply air, during a retraction stroke, to the main air chamber which is partitioned by the support section, the suspension spring section, and the extension and retraction section.

8. The anti-vibration device as described in claim 1, wherein the strut mount section comprises:

a bracket configured to be attached to the vehicle body;

a mounting member attached to the damper rod; and a mount main body rubber that connects the bracket and the mounting member, and the bracket and the mounting member each have a curved part that is curved along a spherical shape with a same center point.

* * * * *